(12) United States Patent
Kim et al.

(10) Patent No.: US 8,391,828 B2
(45) Date of Patent: Mar. 5, 2013

(54) INTERWORKING PROCEDURE WITH EXTERNAL NETWORK IN WIRELESS LAN AND MESSAGE FORMAT FOR THE SAME

(75) Inventors: Eunkyo Kim, Seoul (KR); Jiyoung Huh, Seoul (KR); Jae Young Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1250 days.

(21) Appl. No.: 12/167,130

(22) Filed: Jul. 2, 2008

(65) Prior Publication Data
US 2009/0010399 A1     Jan. 8, 2009

(30) Foreign Application Priority Data

Jul. 4, 2007   (KR) ................ 10-2007-0067203

(51) Int. Cl.
*H04M 11/04*  (2006.01)
*H04W 4/00*   (2009.01)

(52) U.S. Cl. .................... 455/404.1; 370/338; 379/37

(58) Field of Classification Search .... 455/404.1–404.2; 370/338; 379/37, 45, 49, 51
See application file for complete search history.

(56) References Cited

U.S. PATENT DOCUMENTS

| | | | |
|---|---|---|---|
| 2006/0088020 | A1 | 4/2006 | Gass |
| 2007/0032219 | A1 | 2/2007 | Rudolf et al. |
| 2007/0064660 | A1* | 3/2007 | Qi et al. ................. 370/338 |
| 2008/0200142 | A1* | 8/2008 | Abdel-Kader et al. .... 455/404.2 |

FOREIGN PATENT DOCUMENTS

| | | |
|---|---|---|
| JP | 2000-324532 | 11/2000 |
| JP | 2001-045553 | 2/2001 |
| WO | 2005/109930 | 11/2005 |

OTHER PUBLICATIONS

Dave Stephenson et al., "Multiple SSID Support", doc: IEEE 802.11-06/1472r2, Jan. 15, 2007.*

* cited by examiner

*Primary Examiner* — George Eng
*Assistant Examiner* — Nam Huynh
(74) *Attorney, Agent, or Firm* — Lee, Hong, Degerman, Kang & Waimey

(57) ABSTRACT

Provided are an interworking procedure with an external network in a WLAN, a station supporting the interworking procedure, and a message format for the interworking procedure. In the interworking procedure, a non-AP station transmits a request message which includes an advertisement protocol ID set to a value indicating native query protocol and a native query information ID set to a value indicating emergency call number information. And the non-AP station receives from an access point (AP) a response message including zero or more emergency call numbers in response to the request message.

5 Claims, 8 Drawing Sheets

FIG. 3

| Category | Action | Dialog Token | Advertisement Protocol information element | Query Request length | Query Request |
|---|---|---|---|---|---|

FIG. 4

| Element ID | Length | Advertisement Protocol Tuple#1 | Advertisement Protocol Tuple#2 | ... | Advertisement Protocol Tuple#N |
|---|---|---|---|---|---|
| Octets: 1 | 1 | variable | variable | | variable |

FIG. 6

| Category | Action | Dialog Token | Status Code | GAS Query ID | GAS Group Address | GAS Comeback Delay | Advertisement Protocol information element | Query Response Length | Query Response |
|---|---|---|---|---|---|---|---|---|---|

FIG. 7

| Info ID | Length | Status Code | Emergency Call Number Unit #1 | Emergency Call Number Unit #2 (optional) | ... | Emergency Call Number Unit #M (optional) |
|---|---|---|---|---|---|---|
| 1 | 2 | 2 | variable | variable | ... | variable |

Octets:

INTERWORKING PROCEDURE WITH EXTERNAL NETWORK IN WIRELESS LAN AND MESSAGE FORMAT FOR THE SAME

CROSS-REFERENCE TO RELATED PATENT APPLICATIONS

This application claims the benefit of earlier filing date and right of priority to Korean Patent Application No. 10-2007-0067203 filed on Jul. 4, 2007 in the Korean Intellectual Property Office, the disclosure of which is incorporated herein in its entirety by reference.

BACKGROUND OF THE INVENTION

1. Field of the Invention

The present invention relates to a wireless local access network (WLAN), and more particularly, to an interworking procedure with an external network in a WLAN, a station supporting the interworking procedure, and a message format for the interworking procedure.

2. Description of the Related Art

With the development of information communication technology, a variety of wireless communication technology has been developed. A WLAN permits wireless access to intra network and/or Internet in specific service areas such as home or companies or air planes by the use of portable terminals such as a personal digital assistant (PDA), a laptop computer, and a portable multimedia player (PMP) on the basis of radio telecommunication technology.

These days, thanks to the increased availability of WLANs, portable terminal users such as laptop computer users are able to perform their tasks with increased mobility. For example, a user can take his laptop computer from his desk into a conference room to attend a meeting, still have access to his local network to retrieve data, and have access to the Internet via one or more modems or gateways present on the local network without being tethered by a wired connection. Similarly, business travelers commonly use their portable terminals to gain access to their email accounts, to check if there is any unread email, and to read and send email.

In the initial WLAN technology, a data rate of 1 to 2 Mbps was supported by the use of frequency hopping, spread spectrum, and infrared communication using a frequency of 2.4 GHz in accordance with the IEEE 802.11. In recent years, with the development of the wireless communication technology, 54 Mbps in maximum can be supported by applying the orthogonal frequency division multiplex (OFDM) technology, etc. to the WLAN. In addition, the IEEE 802.11 has developed or is developing wireless communication technologies for improvement in quality of service (QoS), compatibility of an access point (AP) protocol, security enhancement, radio measurement or radio resource measurement, wireless access in vehicular environment, fast roaming, mesh network, inter-working with external networks, wireless network management, and the like.

On the other hands, the IEEE 802.11u standard which is a kind of WLAN standards describes an interworking service in the WLANs. The main purpose of the interworking service is to permit the transmission of information from an external network for WLAN users, to help selection of connection networks, and to enable an emergency service. The IEEE 802.11u standard prescribes medium access control (MAC) and physical layer (PHY) protocols necessary for accomplishing the main purpose.

SUMMARY OF THE INVENTION

As described above, a purpose of the interworking service is to provide an emergency service using the WLANs. The emergency service can be provided using various methods, one of which is to give an emergency call to an emergency service center such as a fire station or an emergency room when in an emergency.

A user should know information for identifying the emergency service center, for example, an emergency call number, to give an emergency call to the emergency service center. When the user does have no idea of the emergency call number, the emergency call number should be stored in the terminal for enabling the emergency call to the emergency service center.

However, the emergency call number may be set different depending on countries or local areas of a country. For example, the Korean emergency call number used in an emergency such as fires or emergent situations is "119", the American emergency call number is "911", "44444" is used in fires and "118" is used for an ambulance in Italy, and the British emergency call number is "999". Even in the same country, the call numbers of emergency service centers for fires, accidents, medical emergencies may be different depending on local areas.

As described above, the emergency call numbers may be different depending on countries and/or local areas. Accordingly, in order to give an emergency call to an emergency service center using a WLAN terminal, a user and/or the terminal has to know an emergency call number of an external network connectable to a base station to which the terminal is to be coupled or is coupled. However, since it is not actually possible to store all the emergency call numbers different depending on the countries and/or the local areas in the terminal or the user's memory, base stations need to inform the terminal of the emergency call numbers. Particularly, it is further necessary to provide the emergency call numbers to terminals in a roaming state connected to a visited network.

A technical goal of the invention is to provide an interworking procedure with an external network, which can provide the emergency call number of the external network to a terminal in a WLAN, a station supporting the interworking procedure, and a message format for the interworking procedure.

Another technical goal of the invention is to provide an interworking procedure with an external network, which can provide the emergency call number to a terminal without allowing any base station to transmit a query or request to a distribution system or a server of the external network, a station supporting the interworking procedure, and a message format for the interworking procedure.

According to an aspect of the invention, there is provided an interworking procedure for a non-AP station in wireless local access network, the interworking procedure comprising: transmitting a request message which includes an advertisement protocol ID set to a value indicating native query protocol and a native query information ID set to a value indicating emergency call number information; and receiving from an access point (AP) a response message including zero or more emergency call numbers.

According to another aspect of the invention, there is provided an interworking procedure for an Access Point (AP) in wireless local access network, the interworking procedure comprising: receiving from a non-AP station a request message which includes an advertisement protocol ID set to a value indicating native query protocol and a native query information ID set to a value indicating emergency call number information; and transmitting a response message including zero or more emergency call numbers to the non-AP station.

According to further another aspect of the invention, there is provided a method for constructing a Generic Advertisement Service (GAS) initial request frame which is used for interworking procedure in wireless local access network, the GAS initial request frame comprising: a category field which is set to a value indicating a public action frame; an action field which is set to a value indicating a GAS initial request action; a dialog token field which is set by a requesting station for identifying the exchange of the GAS initial request frame and a GAS initial response frame in response to the GAS initial request frame; an advertisement protocol information element containing an advertisement protocol ID set to a value indicating native query protocol; and a query request field containing a native query information ID set to a value indicating emergency call number information.

According to still further another aspect of the invention, there is provided a method for constructing a Generic Advertisement Service (GAS) initial response frame which is used for interworking procedure in wireless local access network, the GAS initial response frame comprising: a category field which is set to a value indicating a public action frame; an action field which is set to a value indicating a GAS initial response action; a dialog token field which is set to a value identical to a corresponding GAS initial request frame; an advertisement protocol information element containing an advertisement protocol ID set to a value indicating native query protocol; and a query response field containing an emergency call number element.

According to still further another aspect of the invention, there is provided a non-Access Point (AP) station for supporting interworking procedure in wireless local access network, the non-AP station comprising: a processor configured to generate and process frames; and a transceiver operably connected to the processor and configured to transmit and receive the frames for the processor, wherein the processor is configured to generate a generic advertisement service (GAS) initial request frame which includes an advertisement protocol ID set to a value indicating native query protocol and a native query information ID set to a value indicating emergency call number information and to forward the GAS initial request frame to the transceiver, wherein the transceiver is configured to transmit the GAS initial request frame and is also configured to receive from an AP a GAS initial response frame including one or more emergency call numbers in response to the GAS initial request frame and forward the received GAS initial response frame to the processor, and wherein the processor is also configured to process the GAS initial response frame.

According to still further another aspect of the invention, there is provided an Access Point (AP) for supporting interworking procedure in wireless local access network, the AP comprising: a processor configured to generate and process frames; and a transceiver operably connected to the processor and configured to transmit and receive the frames for the processor, wherein the transceiver is configured to receive from a non-AP station a generic advertisement service (GAS) initial request frame which includes an advertisement protocol ID set to a value indicating native query protocol and a native query information ID set to a value indicating emergency call number information and to forward the GAS initial request frame to the processor, wherein the processor is configured to process the GAS initial request frame and is also configured to generate an AP a GAS initial response frame including one or more emergency call numbers in response to the GAS initial request frame and forward the received GAS initial response frame to the processor, and wherein the transceiver is also configured to transmit the GAS initial response frame to the non-AP station.

BRIEF DESCRIPTION OF THE DRAWINGS

The above and other features and advantages of the present invention will become more apparent by describing in detail exemplary embodiments thereof with reference to the attached drawings in which:

FIG. 3 is a diagram illustrating a format of a GAS initial request frame according to the embodiment of the invention.

FIG. 4 is a diagram illustrating a format of an advertisement protocol information element shown in FIG. 3.

FIG. 6 is a diagram illustrating a format of a GAS initial response frame according to the embodiment of the invention.

FIG. 7 is a diagram illustrating a format of an emergency call number information element included in a query response field shown in FIG. 6.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In embodiments and the drawings, respective elements are denoted by designation numerals for convenience.

Figure 1:
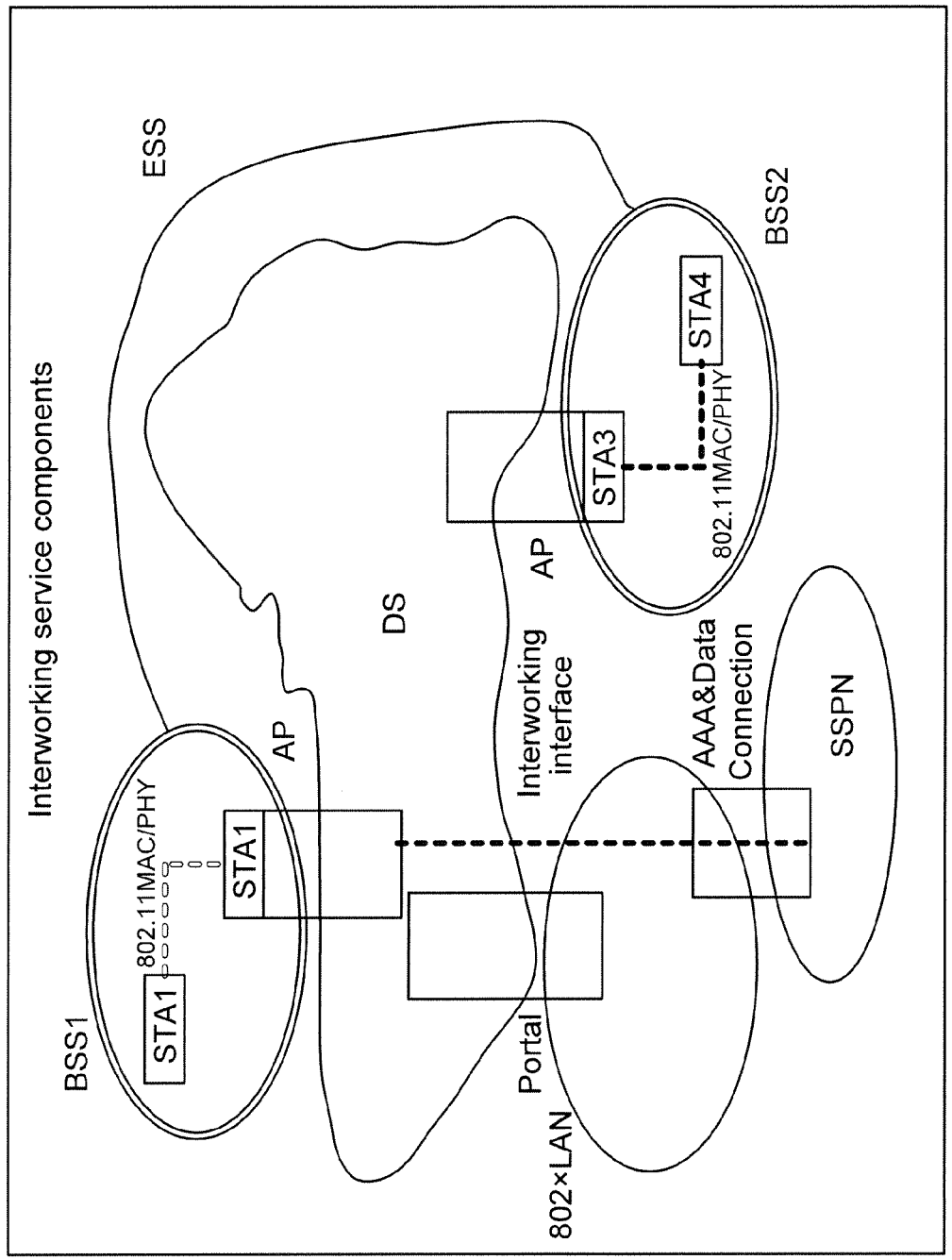
FIG. 1 is a diagram illustrating an IEEE 802.11 interworking architecture including a WLAN system to which embodiments of the invention is applicable.

FIG. 1 is a diagram illustrating an IEEE 802.11 interworking architecture including a WLAN system to which an interworking procedure according to an embodiment of the invention is applicable. An interworking service is defined in the IEEE 802.11u standard. The main purpose of the interworking service is to permit transmission of information from an external network, to help selection of a network, and to permit an emergency service. The IEEE 802.11u standard prescribes all protocols therefor, for example, an interworking interface. In the interworking service, a terminal as a non-AP STA can access services provided from the external network depending on subscription or other characteristics of the external network.

Referring to FIG. 1, an interwork-capable access point (AP) in a wireless system can interwork with the external network using a logical interworking interface. The external network is symbolically shown as an SSPN (Subscription Service Provider Network) in FIG. 1 but the specific configuration thereof does not relate to the embodiments of the invention. The external network is connected to access points via the interworking interface and AAA (Authentication, Authorization, and Accounting) & data connection. The interworking interface goes transparently through a portal and an IEEE 802.xLAN.

The WLAN system includes one or more basic service sets (BSS). The BSS is a set of stations (STA) communicating with each other in successful synchronization, and is not a concept indicating a specific area. The BSS can be classified into an infrastructure BSS and an independent BSS (IBSS). The infrastructure BSS (BSS1 and BSS2) includes one or more STAs (STA1, STA3, and STA4), an access point (AP) which is an STA providing a distribution service, and a distribution system (DS) connecting plural APs (AP1 and AP2) one another. On the other hand, the IBSS does not include an AP and thus all the STAs are mobile stations (STA6, STA7, and STA8). The IBSS does not permit the access to the DS so as to constitute a self-contained network. The embodiments of the invention relate to the infrastructure BSS.

A collection of BSSs in which a set of reachable networks defined by their service set identifiers (SSID) and services provided by those networks available at any BSS are available at all BSSs is a homogenous extended service set identifier (HESSID). All the BSSs identified by the HESSID must also be in the same mobility domain, if one BSS is defined.

A STA is a functional unit including a medium access control (MAC) interface and a physical layer interface for a wireless medium in accordance with the IEEE 802.11 standard, and includes both APs and non-AP STAs in a wide meaning. A portable terminal operated by a user is a non-AP STA (STA1, STA3, STA4, STA6, STA7, and STA8). Simply, a STA may mean a non-AP STA. The non-AP STA may be called a wireless transmitting/receiving unit (WTRU), user equipment (UE), a mobile station (MS), a portable terminal, or a mobile subscriber unit.

The AP (AP1 and AP2) is a functional entity providing access to the DS via a wireless medium for the associated stations. A communication between the non-AP STAs in the infrastructure BSS is made through the AP in principle, but the non-AP STAs may communicate directly with each other when a direct link is set up therebetween. The AP may be called a convergence controller, a base station (BS), a node-B, a base transceiver system (BTS), or a site controller, in addition to the tile of an access point.

Plural infrastructure BSSs can be connected to each other through the DS. The plural BSSs connected through the DS are called an extended service set (ESS). The STAs in the same ESS can communicate with each other and the non-AP STAs can move from one BSS to another BSS while communicating without any interception.

The DS is a system for allowing an AP to communicate with another AP. Accordingly, the AP can transmit a frame for the STAs associated with the BSS managed by the AP, forward a frame when a STA moves to another BSS, or forward a frame to an external network such as a wired network. The DS is not limited in type as long as it can provide a predetermined distribution service defined in the IEEE 802.11 standard, and thus may construct networks various types and/or characteristics.

For example, the DS may be a wireless network such as a mesh network or a physical structure (wired network) for connecting the APs to each other. In the wireless DS, for example, in the mesh network in accordance with the IEEE 802.11s, the end-to-end delay or the throughput may be remarkably deteriorated in comparison with a wired network. However, the wireless network can be installed in a more flexible structure in a space where it is difficult to install a wired network. Regardless of the wired network or the wireless network, the DSs may have predetermined differences in data transmission rate or bandwidth depending on the performance or characteristics thereof, and may be different from each other in connection to an external network such as the Internet.

Figure 2:
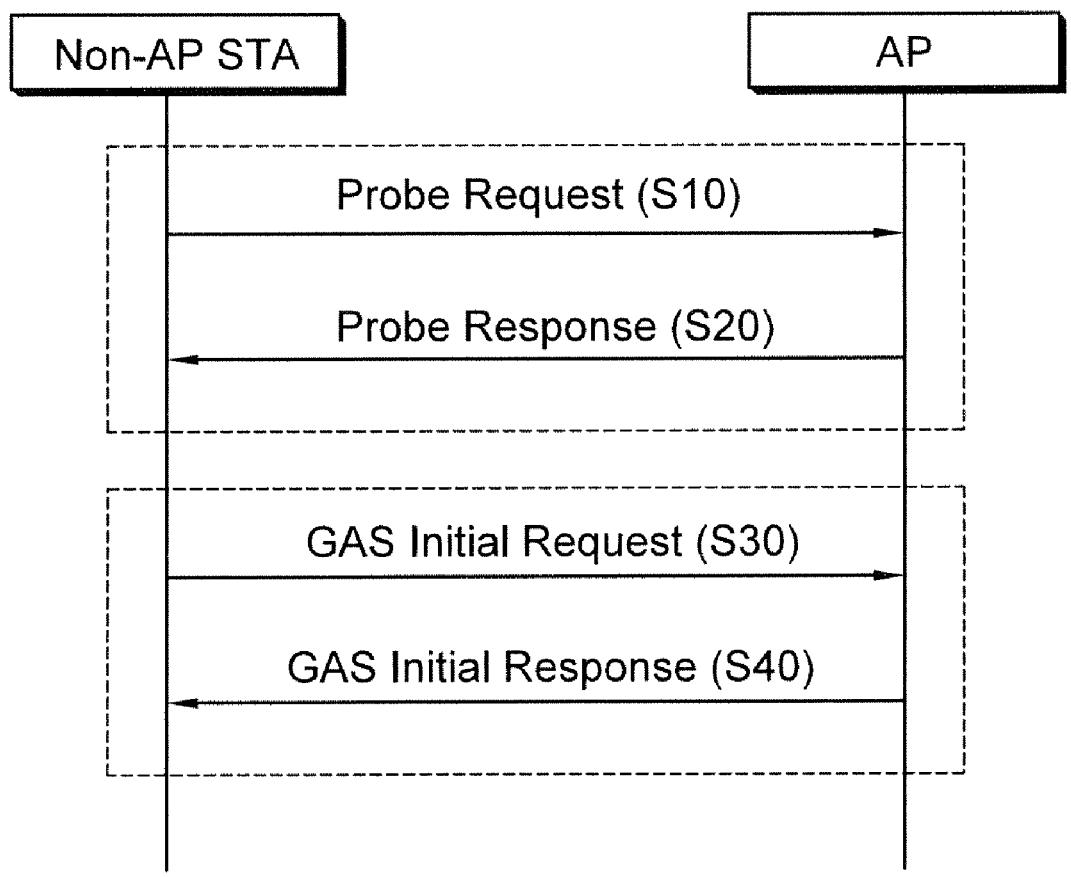
FIG. 2 is a diagram illustrating a flow of messages in an interworking procedure with an external network according to an embodiment of the invention.

FIG. 2 is a diagram illustrating a flow of messages in an interworking procedure with an external network according to an embodiment of the invention. This embodiment provides a procedure of allowing a terminal to acquire an emergency call number of an emergency service center used in a specific local area from a base station so as to support an emergency service from an external network. The emergency service center may be a public safety answering point (PSAP) of the local area or a default emergency call center of the local area.

Referring to FIG. 2, an active scanning procedure (S10 and S20) of transmitting and receiving a probe request frame and a probe response frame between a terminal (non-AP STA) and a base station (AP) is first performed and a generic advertisement service (GAS) procedure (S30 and S40) is then performed. The active scanning procedure (S10 and S20) shown in FIG. 2 is an example of a preliminary procedure of a generic advertisement service procedure (S30 and S40). Although not shown in the drawing, the preliminary procedure of the generic service procedure (S30 and S40) may include only a scanning procedure and an authentication procedure, or may further include an association procedure and/ or a re-association procedure in addition. Accordingly, according to the embodiment of the invention, the generic advertisement service procedure (S30 and S40) can be performed between a terminal (non-AP STA) and a base station (AP) having completed or not having completed the association procedure or the re-association procedure.

In general, the scanning procedure means a procedure of scanning candidate APs with which a non-AP STA associates in the association procedure or the re-association procedure. The scanning procedure can be classified into two types. One type is a passive scanning method using a beacon frame periodically transmitted from an AP. In this type, a non-AP STA intending to access a WLAN can receive a beacon frame periodically transmitted from an AP managing the corresponding BSS and find out an accessible BSS.

The other type is an active scanning method shown in steps S10 and S20 of FIG. 2. In this type, a non-AP STA intending to access a WLAN first transmits a probe request frame (S10). Then, an AP having received the probe request frame transmits a probe response frame including information such as a service set ID (SSID) of the BSS managed by the AP and capability supported by the AP to the non-AP STA (S20). Accordingly, the non-AP STA can know the presence of a candidate AP and a variety of information on the candidate AP.

When the non-AP STA and/or the AP are devices supporting an interworking service, the beacon frame, the probe request frame, and/or the probe response frame transmitted in the scanning procedure can include an interworking information element. The interworking information element serves to provide information on the interworking service capability of the non-AP STA or the AP.

The beacon frame or the probe response frame transmitted by the AP can include an advertisement protocol information element. The advertisement protocol information element is transmitted, when the AP supports the interworking service and one or more generic advertisement service targets are defined. The advertisement protocol information element includes a specific advertisement protocol and information for identifying the corresponding advertisement control. In addition, the advertisement protocol information element can include an advertisement protocol ID that can be supported by the AP.

The authentication procedure is a procedure of negotiating an authentication method and an encoding method between entities participating in the wireless communication. For example, a non-AP STA can perform the authentication procedure with a desired AP of one or more APs found out in the scanning procedure (S10 and S20). Since a WLAN mainly uses an open system authentication method, the AP performs the authentication procedure without any condition in response to an authentication request from the non-AP STA. An example of a reinforced authentication method includes EAP-TLS (Extensible Authentication Protocol-Transport Layer Security) based on IEEE 802.1x, EAP-TTLS (Extensible Authentication Protocol-Tunneled Transport Layer Security), EAP-FAST (Extensible Authentication Protocol-Flexible Authentication via Secure Tunneling), and PEAP (Protected Extensible Authentication Protocol)

When the authentication procedure has been successfully performed, the non-AP STA can perform the association procedure with the AP. The association procedure is to set an identifiable connection, that is, a wireless link, between the non-AP STA and the AP. In the association procedure, the non-AP STA transmits an association request frame to the AP having successfully performed the authentication procedure. The AP transmits an association response frame having a state value of "successful" to the non-AP STA in response to the association request frame. The association response frame includes an identifier, for example, an association ID (AID), for identifying the association with a specific non-AP STA.

When the association procedure has been successfully completed but the connection state between the non-AP STA and the AP deteriorates due to a variable channel state, the non-AP STA can perform the association procedure with another AP having a good channel state again, which is called a re-association procedure. This re-association procedure is considerably similar to the above-mentioned association procedure. More specifically, in the re-association procedure, the non-AP STA transmits a re-association request frame to an AP (for example, an AP having successfully completed the authentication procedure among the candidate APs found out in the scanning procedure (S10 and S20)) other than the AP currently associated therewith. The AP transmits a re-association response frame to the non-AP STA. However, the re-association response frame additionally includes information on the previously associated AP. The AP to be re-associated can transmit data buffered in the previously associated AP to the non-AP STA by the use of the information.

Subsequently, referring to FIG. 2, the PSAP used in the corresponding local area or the non-AP STA intending to acquire the emergency call number of the default emergency service center performs a native GAS procedure with the AP (S30 and S40). The native GAS procedure is based on a native GAS protocol used for the non-AP STA to find out services supported by the AP.

More specifically, first, the non-AP STA transmits a request message, for example, a GAS initial request frame, for requesting for the emergency call number to the AP (S30). The GAS initial request message may be a message including an advertisement protocol ID set to a value indicating a native query protocol and a native query information ID set to a value indicating the emergency call number, but is not limited to the message.

FIG. 3 is a diagram illustrating a format of a GAS initial request frame according to the embodiment of the invention. The GAS initial request frame is a public action frame. The public action frame means a frame defined for a communication or a generic advertisement service between the BSSs or between an AP and a non-AP STA not associated with the AP. An example of the public action frame includes a GAS initial request frame, a GAS initial response frame, a GAS comeback request frame, and a GAS comeback response frame.

Referring to FIG. 3, the GAS initial request frame includes a category field, an action field, a dialog token field, an advertisement protocol information element field, a query request length field, and query request field.

The category field is set to a value indicating a public action frame. The action field is set to a value indicating a GAS initial request action. The dialog token field is set to a value selected by the non-AP STA transmitting the GAS initial request frame and serves to identify the exchange of the GAS initial request frame and a GAS initial response frame corresponding thereto.

The advertisement protocol information element includes information for identifying a particular advertisement protocol and its corresponding advertisement control. An example of a format of the advertisement protocol information is shown in FIG. 4. Referring to FIG. 4, the advertisement protocol information element includes an element ID field, a length field, and N (where N is a natural number) advertisement protocol tuple fields (advertisement protocol tuple #1, advertisement protocol tuple #2, . . . , and advertisement protocol tuple #N).

Figure 5:
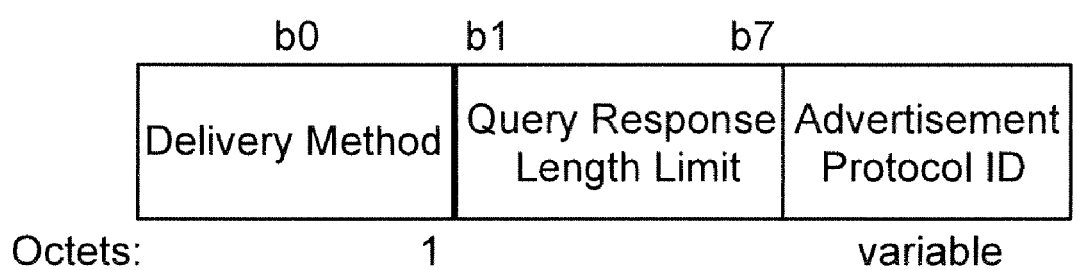
FIG. 5 is a diagram illustrating a format of an advertisement protocol tuple field shown in FIG. 4.

The element ID field is set to a value indicating the advertisement protocol information element. The length field is set to a value indicating the sum of lengths of the subsequent N advertisement protocol tuple fields. Each advertisement protocol tuple field includes a delivery method subfield, a query response length limit subfield, and/or an advertisement protocol ID subfield, a format of which is shown in FIG. 5.

The delivery method subfield is set to a value indicating a method of allowing an AP to transmit a frame of an advertisement protocol specified in the advertisement protocol ID subfield. For example, when the delivery method subfield is set to "1", it means to transmit a frame using a multicast method. When the delivery method subfield is set to "0", it means to transmit a frame using a unicast method. The query response length limit subfield is set to a value indicating the maximum length of information to be transmitted along with the query response field included in one or more GAS comeback response frames.

The advertisement protocol ID subfield is set to a value indicating a native query protocol. The native query protocol is a mechanism used for a non-AP STA to query the AP so as to acquire data prepared locally. That is, when there is a query from the non-AP STA, the AP does not refer the query to a server of a distribution system (DS) or an external network, but responses to the query at once.

Referring to FIG. 3, the query request length field is set to a value indicating the total length of information included in the subsequent query request field. The query request field is a GAS query and is formatted in accordance with the protocol specified in the advertisement protocol information element. According to this embodiment, the query request field is set to an ID value indicating the emergency call number information.

Referring to FIG. 2, the AP transmits a GAS initial response frame to the non-AP STA as a requesting terminal in response to the received GAS initial request frame (S40). The GAS initial response frame may include one or more emergency call numbers or may not include any emergency call number. When the query request of the GAS initial request frame corresponds to the information prepared in the AP, that is, when the emergency call number is stored in the AP, the GAS initial response frame includes one or more emergency call numbers. On the contrary, when the query request of the GAS initial request frame does not correspond to the information prepared in the AP, that is, when an emergency call number is not stored in the AP, the GAS initial response frame does not include any emergency call number.

FIG. 6 is a diagram illustrating a format of the GAS initial request frame according to the embodiment of the invention. As described above, the GAS initial response frame is a kind of public action frame. Referring to FIG. 6, the GAS initial response frame includes a category field, an action field, a dialog token field, a status code field, a GAS query ID field, a GAS group address field, a GAS comeback delay field, an advertisement protocol information element, a query response length field, and a query response field.

The category field is set to a value indicating a public action frame. The action field is set to a value indicating a GAS initial response action. The dialog token field is set to a value indicating equal to the value set in the corresponding GAS initial request frame, that is, the received GAS initial request frame.

The status code field is set to a value indicating the response result to the request and the like. When the query request of the GAS initial request frame corresponds to the information prepared in the AP and the GAS initial response frame includes the requested information (for example, emergency call number), the status code field is set to a value indicating "successful." On the contrary, when the query request of the GAS initial request frame does not correspond to the information prepared in the AP and the GAS initial response frame does not include the requested information (for example, emergency call number), the status code field is set to a value indicating "request info not configured." An example of the value set in the status code field is defined in subsection 7.3.1.9 of the IEEE P802.11-REVma/D9.0 standard (revision of IEEE Std 802.11-1999).

The GAS query ID field is set to a value indicating the query executed on behalf of the non-AP STA. In this embodiment, the GAS query ID field is set to "0". The GAS group address field is set to a value indicating a multicast group address when the response to the query uses the multicast method, and is set to "0" when the response to the query uses the unicast method. The GAS comeback delay field is to specify a delay time.

The advertisement protocol information element includes information for identifying a particular advertisement protocol and its corresponding advertisement control. Since the format of the advertisement protocol information element is described above with reference to FIG. 4, detailed description thereof is omitted. The query response length field is set to a value indicating the total length of the information included in the subsequent query response field.

The query response field is a generic container, the value of which is the response to a GAS query, and is formatted in accordance with the protocol specified in the Advertisement Protocol information element. In this embodiment, the query response field includes the emergency call number information element. The emergency call number information element serves to provide a list of public safety answering points (PSAP) or default emergency call centers. The format of the emergency call number information element is shown in FIG. 7.

Referring to FIG. 7, the emergency call number information element includes an information ID length field, a status code field, and M (where M is a natural number) emergency call number units (emergency call number unit #1, emergency call number unit #2, ..., and emergency call number unit #M). The information ID field is set to a value indicating the emergency call number information. The length field is set to a value indicating the total length of the subsequent fields. The status code field is set to a value indicating one of meanings shown in Table 1.

TABLE 1

| Meaning |
| --- |
| No outstanding GAS request |
| GAS Query Protocol(s) not supported |
| GAS Response not received from the server in the DS or external network |
| AP timed out waiting for GAS Query Response from the server in the DS or external network |
| GAS Query Response larger than permitted per configured AP policy |
| Advertisement server in the network is not currently reachable |
| Requested information is not configured for this BSSID |
| Request refused due to permissions received via SSPN interface |

Each emergency call number unit includes an emergency call number length subfield and an emergency call number subfield. The emergency call number length subfield is set to a value indicating the length of the emergency call number subfield. The emergency call number subfield is set to a value indicating emergency call digits supported by the corresponding network.

Figure 8:
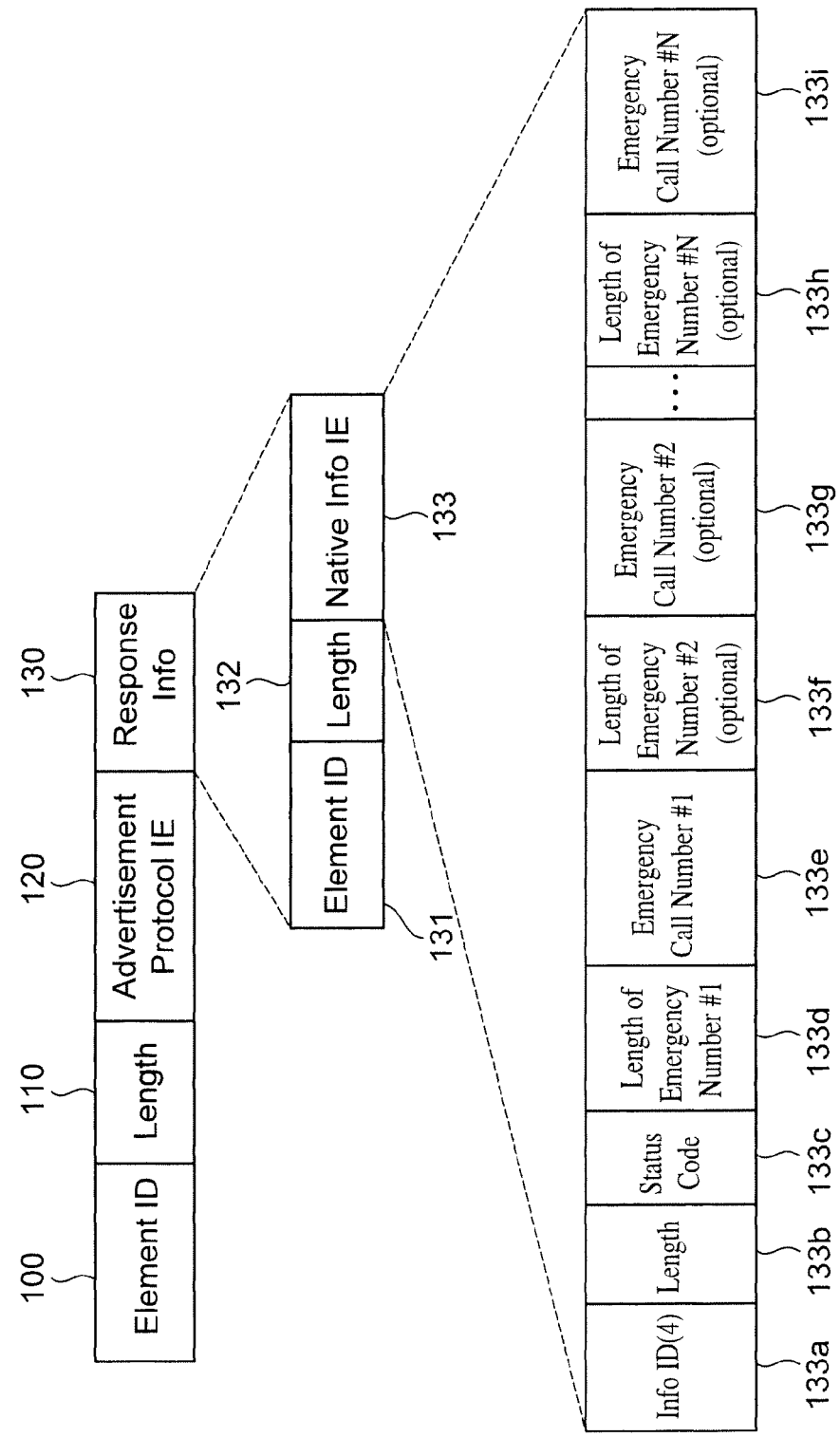
FIG. 8 is a diagram illustrating a format of a GAS initial response frame according to the embodiment of the invention.

FIG. 8 is a diagram illustrating another format of the GAS initial response frame according to the embodiment of the invention.

As shown in FIG. 8, the GAS initial response frame includes an element ID field 100 indicating that the corresponding message is a generic advertisement service response message, a length field 110 indicating the lengths of the subsequent fields, a field 120 including an advertisement protocol information element, and a response information field 130.

The response information field 130 includes an element ID subfield 131 indicating a response information field, a length subfield 132 indicating the lengths of the subsequent fields, and a native information element subfield 133. The number of native information element subfields 133 may be two or more. In this case, plural information elements of the same kind may be included in the native information element subfields 133.

On the other hand, as described above, an emergency call number list element indicating emergency call information is included in one of the native information element subfields or the corresponding native information element subfield. The emergency call number may be a telephone number or an URI.

The emergency call number list element includes an information ID subfield 133a indicating the emergency call number list element, a length subfield 133b indicating the lengths of the subsequent subfields, and a status code subfield 133c indicating a status for advertising terminals of the emergency call number list. A field 133d indicating the length of emergency number #1 and a field 133e indicating emergency call number #1 are subsequent.

The field 133d indicating the emergency call number length and the field 133e indicating the emergency call number form a pair. When the number of emergency call numbers is one, only one field indicating the emergency call number length and only one field indicating the emergency call number are included. When the AP transmits plural emergency call numbers to the non-AP STA, plural fields 133f and 133h indicating the lengths of emergency call numbers #2 to #n and plural fields 133g and 133i indicating the emergency call numbers #2 to #n are included.

The embodiments described above in detail are only examples explaining the technical spirit of the invention and it should be understood that the technical spirit is not limited to the embodiments. The scope of the invention is defined by the appended claims.

According to an embodiment of the invention described above, even before a terminal (station) is associated with a WLAN through a base station (access point), the terminal can request the base station for the emergency call number to be supported by the network. When receiving the request from the terminal, the base station can provide one or more emergency call numbers to the terminal. Accordingly, even before association, a user can know the call numbers of the emergency service centers provided from the network or can store the call numbers in the terminal as needed. In an emergency, the user can try to give an emergency call using the call numbers.

In this case, the emergency call numbers may be data previously configured in the base station. Accordingly, even when receiving the request for an emergency call number from the terminal, the base station can provide the emergency call number to the terminal without particularly communicating with a distribution system or a server of an external network.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for interworking with an external network in a wireless local access network, the method comprising:
   transmitting, by a requesting station, a generic advertisement service (GAS) initial request frame to a responding station, the GAS initial request frame including:
      a category field set to a value indicating a public action frame;
      an action field set to a value indicating the GAS initial request frame;
      an advertisement protocol element indicating a query to the responding station to retrieve information from an advertisement server of the external network; and
      a query request element indicating a query for emergency call number information; and
   receiving, by the requesting station, a GAS initial response frame from the responding station, the GAS initial response frame including:
      a category field set to a value indicating a public action frame;
      an action field set to a value indicating the GAS initial response frame; and
      a query response element including a list of emergency call numbers retrieved from the advertisement server.

2. The method according to claim 1, wherein the query response element further includes an information ID field indicating the emergency call number information.

3. The method according to claim 1, wherein the list of emergency call numbers are directed to a public safety answering point (PSAP).

4. A wireless device for interworking with an external network in a wireless local access network, the wireless device comprising:
   a processor configured to generate and process frames; and
   a transceiver operably connected to the processor and configured to transmit and receive the frames for the processor,
   wherein the processor is further configured to:
      transmit, via the transceiver, a generic advertisement service (GAS) initial request frame to a responding station, the GAS initial request frame including:
         a category field set to a value indicating a public action frame;
         an action field set to a value indicating the GAS initial request frame;
         an advertisement protocol element indicating a query to the responding station to retrieve information from an advertisement server of the external network; and
         a query request element indicating a query for emergency call number information; and
      receive, via the transceiver, a GAS initial response frame from the responding station, the GAS initial response frame including:
         a category field set to a value indicating a public action frame;
         an action field set to a value indicating the GAS initial response frame; and
         a query response element including a list of emergency call numbers retrieved from the advertisement server.

5. A wireless device for interworking with an external network in a wireless local access network, the wireless device comprising:
   a processor configured to generate and process frames; and
   a transceiver operably connected to the processor and configured to transmit and receive the frames for the processor,
   wherein the processor is further configured to:
      receive, via the transceiver, a generic advertisement service (GAS) initial request frame from a requesting station, the GAS initial request frame including:
         a category field set to a value indicating a public action frame;
         an action field set to a value indicating the GAS initial request frame;
         an advertisement protocol element indicating a query to the wireless device to retrieve information from an advertisement server of the external network; and
         a query request element indicating a query for emergency call number information;
      retrieve, via the transceiver, a list of emergency call numbers from the advertisement server; and
      transmit, via the transceiver, a GAS initial response frame to the requesting station, the GAS initial response frame including:
         a category field set to a value indicating a public action frame;
         an action field set to a value indicating the GAS initial response frame; and
         a query response element including the list of emergency call numbers retrieved from the advertisement server.

* * * * *